United States Patent
Weon et al.

(10) Patent No.: US 7,283,029 B2
(45) Date of Patent: Oct. 16, 2007

(54) 3-D TRANSFORMER FOR HIGH-FREQUENCY APPLICATIONS

(75) Inventors: Dae-Hee Weon, West Lafayette, IN (US); Saeed Mohammadi, Zionsville, IN (US); Jong-Hyeok Jeon, West Lafayette, IN (US); Linda P. B. Katehi, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 11/294,721

(22) Filed: Dec. 5, 2005

(65) Prior Publication Data

US 2006/0176136 A1 Aug. 10, 2006

Related U.S. Application Data

(60) Provisional application No. 60/634,713, filed on Dec. 8, 2004.

(51) Int. Cl.
*H01F 5/00* (2006.01)
*H01F 7/06* (2006.01)

(52) U.S. Cl. .................... 336/200; 336/223; 336/232; 29/602.1

(58) Field of Classification Search ........... 336/200, 336/223, 232; 29/602.1
See application file for complete search history.

(56) References Cited

U.S. PATENT DOCUMENTS

| | | | |
|---|---|---|---|
| 5,430,424 A | 7/1995 | Sato et al. | |
| 5,793,272 A | 8/1998 | Burghartz et al. | |
| 5,835,371 A | 11/1998 | Kume et al. | |
| 5,847,947 A | 12/1998 | Pan et al. | |
| 5,872,384 A | 2/1999 | Gabara | |
| 5,884,990 A | 3/1999 | Burghartz et al. | |
| 6,054,329 A | 4/2000 | Burghartz et al. | |
| 6,114,937 A | 9/2000 | Burghartz et al. | |
| 6,376,909 B1 | 4/2002 | Forbes et al. | |
| 6,397,171 B1 | 5/2002 | Belk | |
| 6,429,764 B1 * | 8/2002 | Karam et al. | 336/200 |
| 6,495,019 B1 | 12/2002 | Filas et al. | |
| 6,534,249 B2 * | 3/2003 | Fork et al. | 430/322 |
| 6,534,843 B2 | 3/2003 | Acosta et al. | |
| 6,535,098 B1 * | 3/2003 | Yeo et al. | 336/200 |
| 6,539,253 B2 | 3/2003 | Thompson et al. | |
| 6,567,703 B1 | 5/2003 | Thompson et al. | |
| 6,624,498 B2 | 9/2003 | Filas et al. | |

(Continued)

OTHER PUBLICATIONS

Out-of-Plane High-Q Inductors on Low-Resistance Silicon, Dec. 6, 2003, Christoper I. Chua, David K. Fork, Koenraad Van Schuylenberg, and Jeng-Ping Lu.

(Continued)

*Primary Examiner*—Anh Mai
(74) *Attorney, Agent, or Firm*—Brinks Hofer Gilson & Lione

(57) ABSTRACT

A stressed metal technology may fabricate high-Q, three-dimensional microelectronic inductors and transformers. The fabrication method may allow the production of inductors and transformers on high-resistivity silicon substrate and with metal deposition of Au and Cr that is fully compatible with semiconductor fabrication technologies. The produced inductors and transformers exhibit Q factors>60 at frequencies of 3 to 7 GHz. High efficiency, high-Q transformers with coupling factors 0.6<k<0.9 may be created with very high self-resonance frequencies.

18 Claims, 8 Drawing Sheets

U.S. PATENT DOCUMENTS

| | | |
|---|---|---|
| 6,683,510 B1 | 1/2004 | Padilla |
| 6,751,245 B1 * | 6/2004 | Wasserbauer et al. ... 372/46.01 |
| 6,762,088 B2 | 7/2004 | Acosta et al. |
| 6,812,819 B2 | 11/2004 | Le Grand de Mercey et al. |
| 6,856,003 B2 * | 2/2005 | Lee et al. .................. 257/531 |
| 2004/0041234 A1 | 3/2004 | Sia et al. |
| 2004/0045232 A1 | 3/2004 | Lee et al. |

OTHER PUBLICATIONS

High-Q Integrated 3-D Inductors and Transformers for High Frequency Applications, IMS 2004, Dec. 8, 2003, Dae-Hee Weon, Jong-Hyeok Jeon, Jeong-Il Kim, Saeed Mohammadi, and Linda P. B. Katehi.

* cited by examiner

3-D TRANSFORMER FOR HIGH-FREQUENCY APPLICATIONS

PRIORITY CLAIM

This application claims the benefit of priority from U.S. Provisional Application No. 60/634,713, filed Dec. 8, 2004, which is incorporated herein by reference.

BACKGROUND

1. Technical Field

This invention relates to semiconductor processing of electronic components. In particular, the invention relates to 3-D inductor and transformer elements formed by semiconductor processing.

2. Related Art

Nanoscale CMOS and SiGe BiCMOS processes have recently enhanced the performance of Si-based RFICs up to microwave frequencies. With $f_T$ and $f_{max}$ of the transistor approaching 200 GHz, the requirement for high performance passive elements is the bottleneck in designing state-of-the-art RF circuits. Inductors and transformers play a role in the performance achieved by RF circuits such as voltage controlled oscillators (VCOs), low-noise amplifiers (LNAs), filters, mixers, and power amplifiers (PAs). Among inductor and transformer parameters that limit the performance of an RF integrated circuits are quality factor (Q, where $Q=\omega L/R$, $\omega$=frequency, L=inductance of inductor, R=resistance of inductor)), self-resonance frequency ($f_{sr}$), and distributed effects. Higher Q inductors and transformers help minimize RF power loss, RF noise, phase noise and DC power consumption of RFIC circuits.

Self-resonance frequency of the inductors and transformers may also affect circuit implementation at higher frequencies. Little work has been done on high frequency transformers with a respectable quality factor and resonance frequency beyond 5 GHz. Some of these approaches may use unconventional fabrication technologies that are difficult to integrate, such as the use of metals like Co.

The quality factor of an inductor or a transformer may be determined by its geometry, the type of interconnect metal (Al, Au or Cu), thickness of the metallization, vertical distance between the underpass/airbridge to the inductor windings, dielectric loss of the substrate (low or high resistivity), and by the selective removal of silicon from beneath the inductor structure. Thicker metallization and removal of substrate material may provide a substantial improvement in Q. Substrate removal has the disadvantage of additional cost of post processing on the inductors and weaker mechanical strength.

High-Q three-dimensional inductors based on stressed metal technology have been recently introduced. Stressed metal technology creates three-dimensional, out-of-plane structures by releasing metal structures from the pre-processed substrate and allowing the metal structures to move, under the material stresses in the metal, in a desired direction. Unlike spiral, in-plane inductors, the magnetic field in these inductors is not perpendicular to the substrate. These recently introduced inductors have shown very high quality factors up to 1 GHz operational frequency due to a reduction of losses associated with eddy currents generated in the Si substrate. At higher frequencies, the quality factor has degraded substantially, due to the magnetic field penetration into the lossy Si substrate.

Therefore, a need exists for three-dimensional microelectronic inductors and transformers exhibiting high Q factors at suitable frequencies.

SUMMARY

In the present invention, high-Q three-dimensional, out-of-plane inductors and transformers are fabricated on a Si substrate, using a stressed metal technology. The fabrication technology of the present invention is based on depositing Cr and Au, which are both compatible with integrated circuit fabrication. By adjusting the thickness of deposited Cr and Au, the correct amount of stress may be achieved (compressive in upper metal and tensile in lower metal), such that upon releasing the Cr and Au metal combination from its sacrificial layer, the two ends of each metal finger meet the neighboring fingers above the substrate to form a three-dimensional device such as an inductor or transformer.

The present invention also provides a method for fabricating high-Q three-dimensional inductors and transformers on a pre-processed silicon substrate using a stressed metal technology. The steps in the fabrication process are as follows. A sacrificial layer composed of photo-resist is defined by a photolithographic process. Next, metal layers composed of a chromium (Cr) and gold (Au) combination are deposited on top of the sacrificial layer using an e-beam evaporation process.

After the metal deposition step, a photo-resist mask, for defining metal fingers in the underlying metal, is deposited. Then, chromium and gold metal etch chemistry is used to remove excess metal layers to define the metal fingers which will make up the inductor or transformer structure. A wet etch process is employed to remove excess photo-resist. The wet etch process also removes the sacrificial layer underneath the metal finger areas.

During this releasing step, as the metal fingers in the Cr and Au metal layer are defined, and the overlying photo-resist and sacrificial layer are etched away, the metal fingers are released from the sacrificial layer and bend upward. By adjusting the thickness of the deposited Cr and Au, the correct amount of stress in the layer can be achieved (compressive in the upper metal and tensile in the lower metal), such that upon releasing the metal fingers, the two ends of each metal finger meet the neighboring fingers above the substrate to form a three-dimensional device such as an inductor or transformer.

Finally, after the processing steps are complete, an electroplating process is performed to improve the conductivity of the three-dimensional metal windings and the stiffness of the three-dimensional structure.

The present invention also provides high-Q, three-dimensional microelectronic inductors and transformers on pre-processed silicon substrates. By employing the above-described fabrication process, out-of-plane metal structures in the form of fingers are joined to form circular or oval-shaped structures that function as inductors and transformers when integrated with other microelectronic structures. The inductors and transformers formed have a coil axis substantially parallel to the plane of the underlying substrate, and the three-dimensional structures have cross-sections that are substantially circular or oval-shaped. Inductors have been created with high Q factors greater than 60. In addition, high-Q transformers with 3:4 ratios have been created with coupling factors of 0.6<k<0.9 with very high self-resonance frequencies (8 GHz<fres<16 Ghz).

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
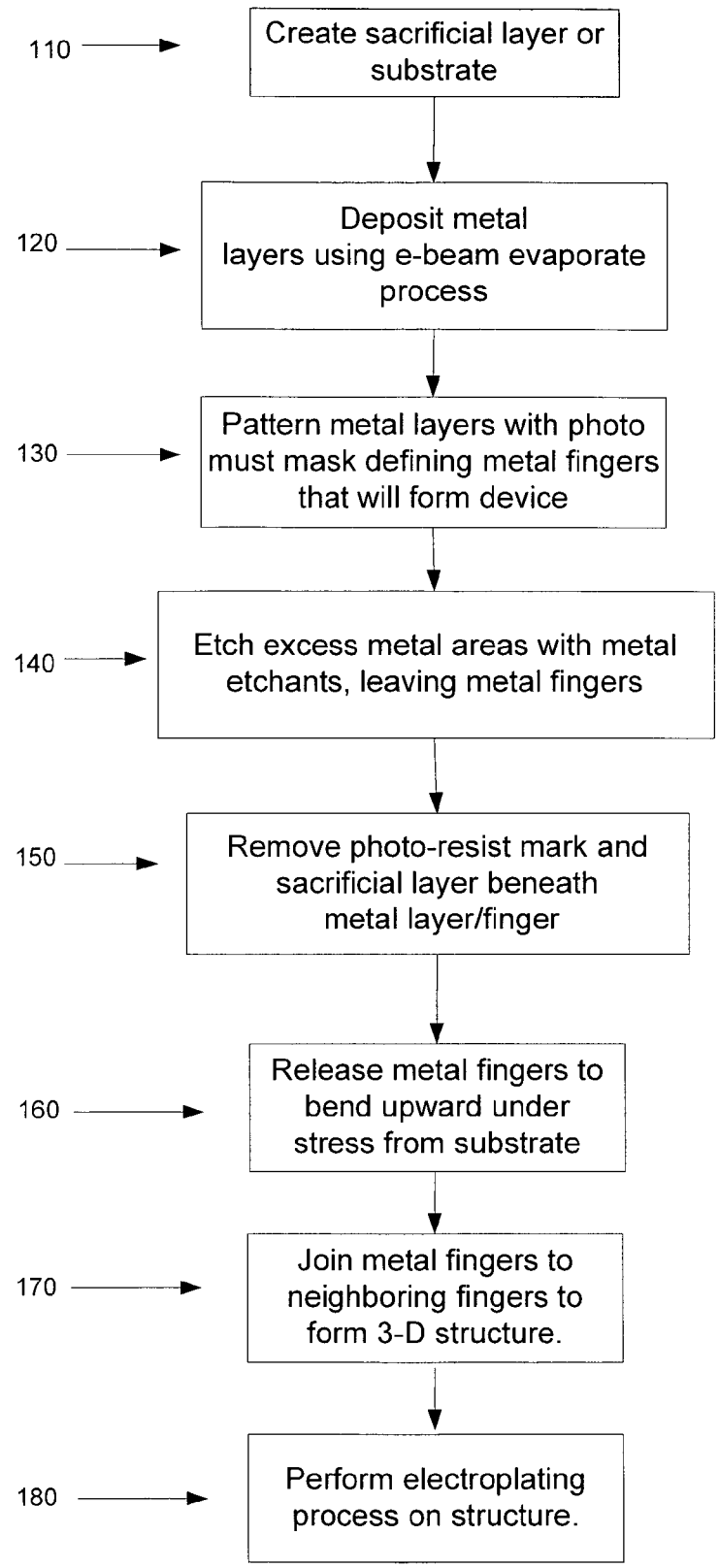
FIG. 1 is a flow diagram depicting the fabrication steps of a three-dimensional inductive device.
Figure 2:
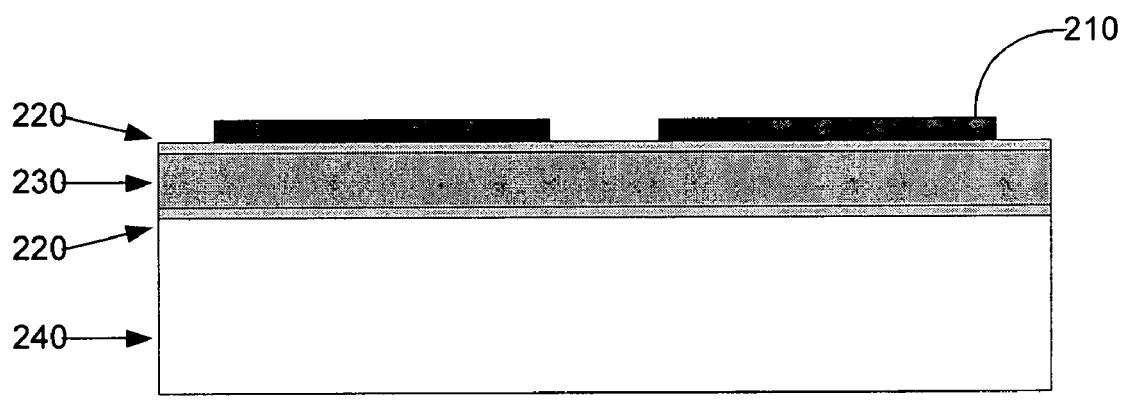
FIG. 2 presents a first step of a fabrication process.

FIG. 1 presents a fabrication process for producing a high-Q, three-dimensional inductor or transformer. A sacrificial layer of photo-resist 210 (see FIG. 2) is deposited, at block 110, using semiconductor photolithographic processing equipment, on a pre-processed silicon substrate 240. This pre-processed substrate may comprise high resistivity silicon 240, silicon dioxide ($SiO_2$) 220, or high dielectric constant materials such as SU-8™ 230. The photo-resist 210 may be a negative or positive-type photo-resist, as needed to operate with the photolithography process. The photo-resist 210 may be a polymer sensitive to certain wavelengths of light, typically ultraviolet radiation. A mask plate (not shown) that embodies an image of the structures to print on the circuit may be placed above the photo-resist layer 210 and the photo-resist is exposed to an ultraviolet light. The exposed resist may be developed in a solution. The solution may be a base such as potassium hydroxide (KOH). The areas of the photo-resist that are exposed are hardened and therefore do not wash in the developer. Areas that are not exposed are removed in the developer. The desired shape from the mask is then transferred to the photoresist 210. This sacrificial layer 210 will be removed in a later releasing process.

Figure 3:
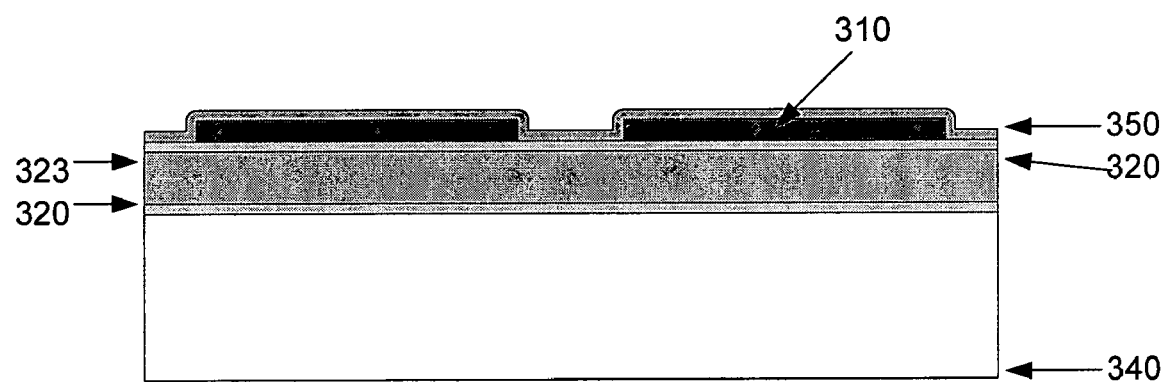
FIG. 3 presents a second step of a fabrication process.

A combination bi-metal layer 350 (see FIG. 3) is deposited, at block 120, on the sacrificial layer 320. The bi-metal layer 350 may include chromium (Cr) and gold (Au). The bi-metal layer 350 may be deposited using an e-beam evaporation process. The bi-metal layer thickness 350 may be about 1 μm. By adjusting the thickness of the deposited Cr and Au in the combination metal layer, the correct amount of stress may be achieved. The correct amount of stress may be compressive in the upper metal portions of the layer and tensile in the lower metal portions of the layer. Upon releasing the Cr and Au metal combination from its sacrificial layer in a later process, the bi-metal combination layer will bend upward. In addition, the use of Cr and Au may be compatible with integrated circuit fabrication without requiring different process equipment.

Figure 4:
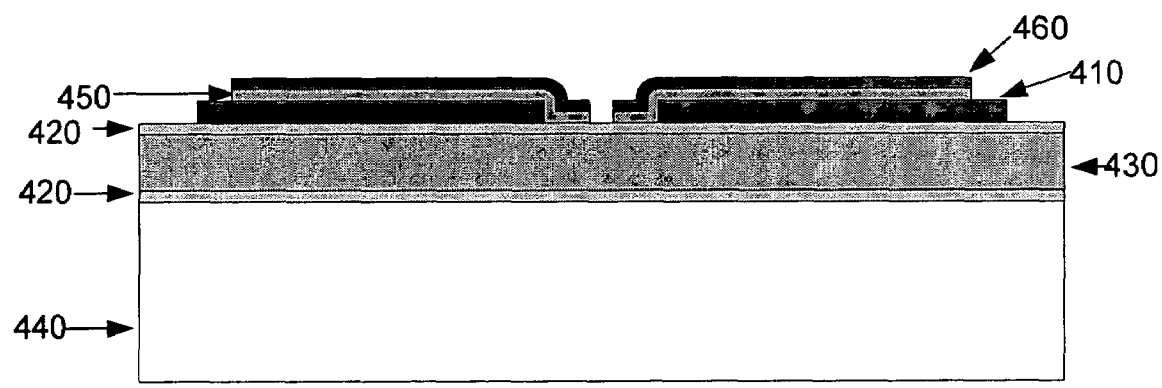
FIG. 4 presents a third step of the fabrication process.
Figure 8:
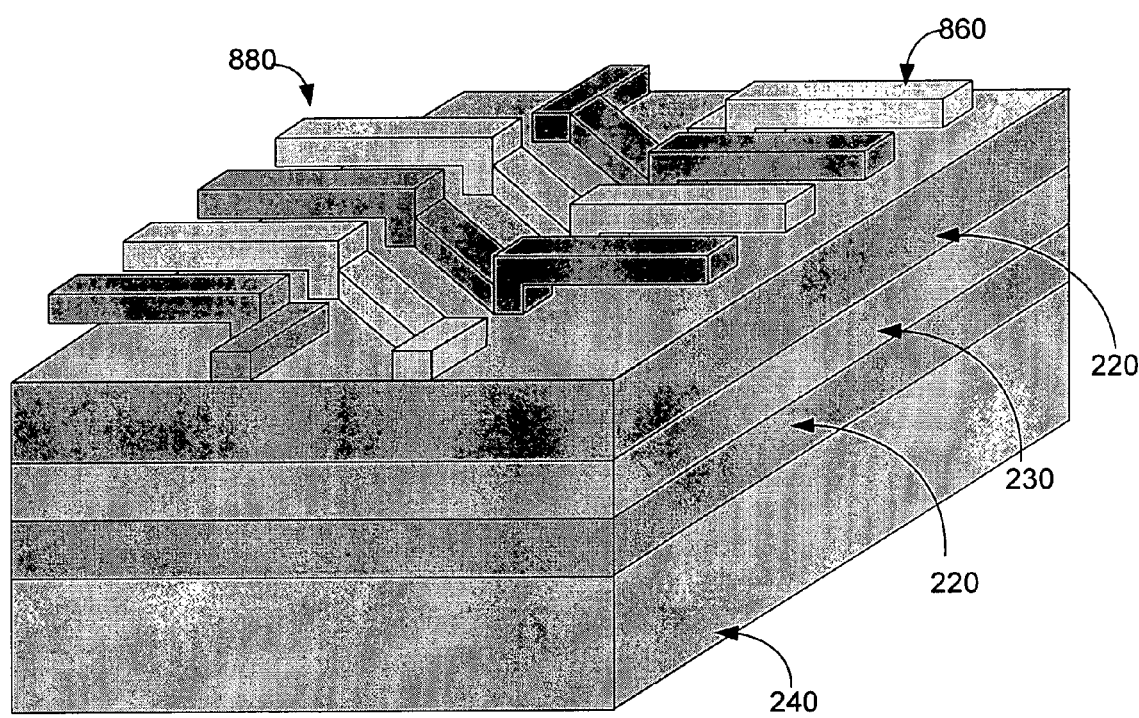
FIG. 8 presents a top-down view of a processed inductive device.

After the Cr and Au bi-metal combination layer 450 (FIG. 4) is deposited at block 120, the bi-metal layer 450 is patterned, at block 130, to form the selected areas which will form the coils of the inductor or transformer structure at the end. After deposition of the bi-metal layer 450, another photolithography process step is performed, also at block 130, to deposit a layer of photo-resist 460 on top of the bi-metal layer 450. The photolithography masking step defines regions of the metal (860 and 880) (see FIG. 8) that will remain after a metal etch step. The photolithography masking step defines the finger-shaped areas (860 and 880) of the bi-metal layer 450 that will form the structure of the completed inductor or transformer. The masking process does this by depositing a photo-resist which will protect certain metal layer areas (the areas forming the metal fingers 860 and 880) from succeeding metal etch steps.

A metal etch process employing Cr and Au metal etchant chemistries is performed, at block 140, to remove excess metal areas and leave behind the desired finger-shaped metal areas (860 and 880). In some methods, the processed substrate with the deposited metal and photo-resist layers is dipped in an acid solution that preferentially etches away the species of metal that comprises the deposited metal layer. The metal layer areas that are not protected by photo-resist 460 are removed by the metal etch, leaving the desired metal features (860 and 880) protected underneath the photo-resist 460.

Figure 5:
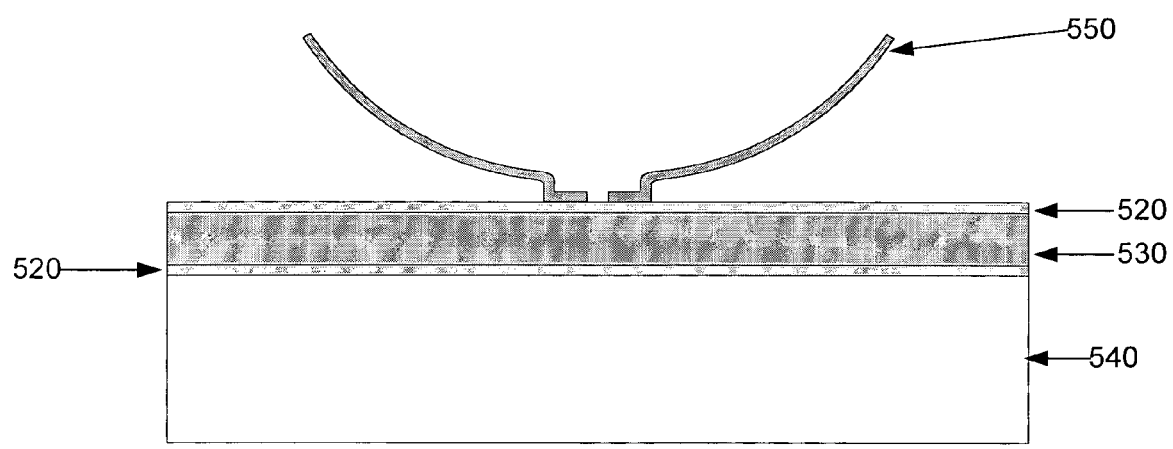
FIG. 5 presents a fourth step.

A wet etch process is employed to remove the photo-resist mask 460 and the sacrificial layer 410 underneath the metal layers 450, during the following releasing blocks 150 and 160. After the sacrificial layer 410 is etched away, the remaining finger-shaped metal areas (860 and 880) are released, at block 160, from the underlying substrate. The finger-shaped metal areas 550 (see FIG. 5) bend upward under the stresses of the Cr and Au combination bi-metal layer 450—compressive stress in the upper portion of the bi-metal layer, tensile stress in the lower portion of the bi-metal layer—away from the underlying pre-processed substrate 520.

Figure 6:
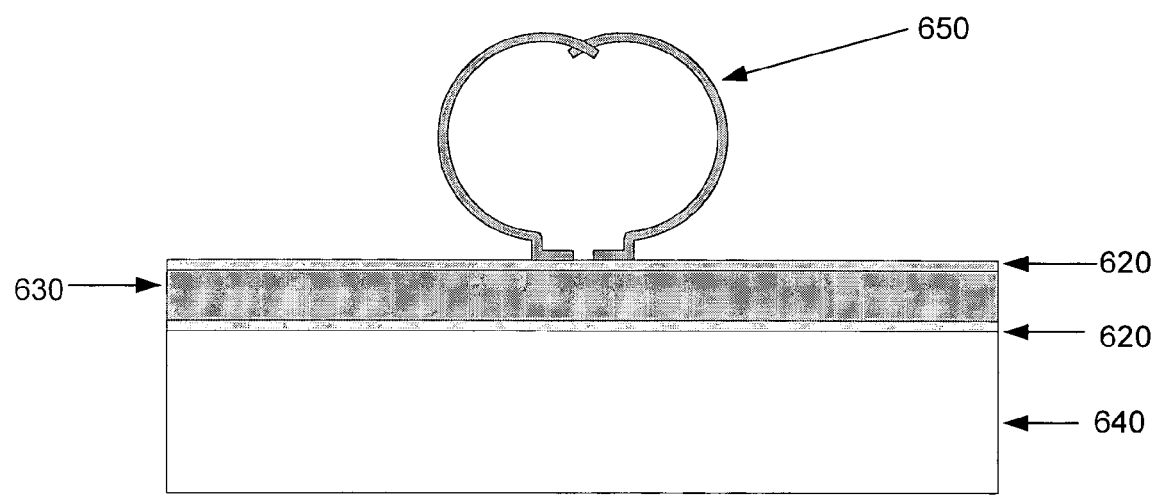
FIG. 6 presents a fifth step of the fabrication process.

As the finger-shaped metal areas 860 bend upward, at block 160, they will join neighboring finger-shaped metal areas 880 to form a three-dimensional, substantially circular or oval shaped structure 650, at block 170 (see FIG. 6). The joined finger-shaped metal areas (860 and 880) become the finished inductor or transformer. The central axis of the formed coil of the inductor or transformer will be substantially parallel to the plane of the underlying pre-processed substrate. After the three-dimensional structure is formed by joining the neighboring finger-shaped metal areas 860 and 880, an electroplating process is performed, at block 180. The electroplating process may improve the conductivity of the three-dimensional windings of the structure 650 and the stiffness of the three-dimensional structure 650.

Figure 7:
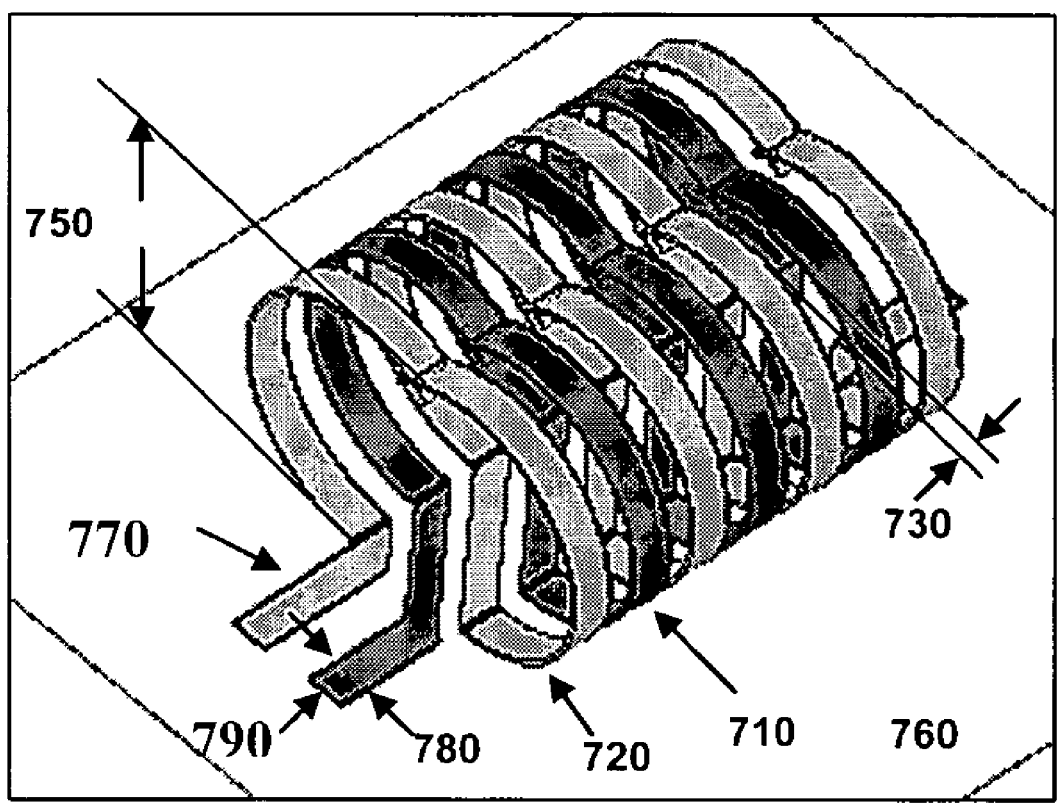
FIG. 7 presents a view of a high-Q, three-dimensional 3:4 transformer with corresponding dimensional parameters.

The process illustrated in FIG. 1 also may provide for high-Q three-dimensional inductive devices such as inductors and transformers for integration with microelectronic components. FIG. 7 presents a representative 3:4 ratio transformer, where the primary line 720 contains 3 turns and the secondary line 710 contains 4 turns. Metal line interconnects from a microelectronic integrated circuit may be joined to the formed inductor or transformer to use the inductor or transformer as an active inductive device in the integrated circuit. These metal interconnects may run along the surface of the substrate. Generally, one interconnect line 770 will form one coil (the primary coil) 720 of the transformer and a second interconnect line 790 will form a second coil (the secondary coil) of the transformer 710. If the interconnects to the coils 770 and 790 are changed to include the same metal interconnect line, an inductor is formed. If the interconnects 770 and 790 are different metal lines, then a transformer will be formed.

The transformer may include a number of primary coil turns 720 and a number of secondary coil turns 710. The parameters defining the device may include the diameter of the three-dimensional structure 750, the width of the coils (formed from joined finger-shaped metal areas) 780, and gap between successive coil turns 730. By varying these parameters along with the number of turns of the coil, different results may be obtained. For example, 3 turn inductors with gaps 730 of 9 μm and widths 780 of 25 μm were created with Q>60, and 3:4 transformers were created with coupling ratios of 0.77 (0.9 at Qmax/2) with an $f_{sr}$ of 7.9 GHz. The typical diameter 750 of the formed structures is around 300 μm. The turn ratio for the transformer may be anything that is desired depending on the intended application ranging from 1:1 to any other ratio. For applications at high frequency, such as in RF applications, typically values like 1:3, 3:4, or 3:5 are implemented. For applications in power converters, turn ratios such as 4:64 may be more suitable. These examples do not limit the possible permutations of ratios that a transformer coil may embody.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

What is claimed is:

1. A method of fabricating a high-Q, three-dimensional microelectronic transformer with a primary coil and a secondary coil comprising:
   providing a pre-processed semiconductor substrate;
   depositing a photo-resist sacrificial layer on top of the semiconductor substrate;
   depositing a layer of metal alloy on top of the sacrificial layer;
   patterning the metal layers by depositing a photo-resist mask layer on top of the layer of metal alloy to define areas for removal of certain areas of the layer of metal alloy to form a number of finger-shaped extensions;
   releasing the certain areas of metal alloy from the sacrificial layer and the substrate in order to allow the areas to bend upward from the semiconductor substrate; and
   joining the end part of the finger-shaped extensions of the certain areas of metal alloy layers with neighboring end part of the finger-shaped extensions of the certain areas of metal alloy layers to form a three-dimensional structure as a microelectronic transformer with a primary coil and a secondary coil.

2. A method according to claim 1 further comprising:
   applying an etch process to remove the mask layer and the sacrificial layer, and the certain areas of metal alloy layer; and
   applying a metal etch process to remove the certain areas of metal alloy layer.

3. A method according to claim 2 further comprising applying an electroplating process to the three-dimensional structure to improve the conductivity and stiffness of the structure.

4. A method according to claim 1 where the semiconductor substrate comprises silicon.

5. A method according to claim 1 where the substrate comprises a layered structure of a high resisitivity silicon base layer, a silicon dioxide layer on the base layer, a high dielectric constant dielectric material layer on the silicon dioxide layer, and a silicon dioxide layer on the dielectric material layer.

6. A method according to claim 1 where the metal layers comprise chromium and gold.

7. A method according to claim 1 where the three-dimensional structures are substantially circular shaped in cross-section.

8. A method according to claim 1 where the three-dimensional structures are substantially oval shaped in cross-section.

9. A method according to claim 1 where the depositing of a metal alloy layer is performed by an e-beam evaporation process.

10. A high-Q, three-dimensional microelectronic inductive device for use in integrated circuit applications comprising:
    a semiconductor substrate having a planar surface;
    metal line interconnects running along the surface of the semiconductor substrate;
    metal fingers each separated by a gap from each other formed on the substrate and connected to the metal line interconnects;
    where the fingers meeting neighboring fingers above the semiconductor substrate to form a coil-shaped device with a diameter and a central axis of the coil substantially parallel to a plane formed by the surface of the substrate, and
    where the inductive device comprises a transformer with a primary coil, a secondary coil, and interconnects leading from the primary coil and the secondary coil.

11. A high-Q, three-dimensional microelectronic inductive device as in claim 10 where the metal fingers comprise chromium and gold.

12. A high-Q, three-dimensional microelectronic inductive device as in claim 10 where the coil-shaped device has a substantially circular cross-section.

13. A high-Q, three-dimensional microelectronic inductive device as in claim 10 where the coil-shaped device has a substantially oval-shaped cross-section.

14. A high-Q, three-dimensional microelectronic inductive device as in claim 10 where the number of metal fingers is greater than 1.

15. A high-Q, three-dimensional microelectronic inductive device as in claim 10 where the substrate comprises silicon.

16. A high-Q, three-dimensional microelectronic inductive device as in claim 10 where the substrate comprises a layered structure of a high resisitivity silicon base layer, a silicon dioxide layer on the base layer, a high dielectric constant dielectric material layer on the silicon dioxide layer, and a silicon dioxide layer on the dielectric material layer.

17. A high-Q, three-dimensional microelectronic inductive device as in claim 10 where the inductive device comprises an inductor with a number of turns comprising the inductor.

18. A high-Q, three-dimensional microelectronic inductive device as in claim 10 where the transformer is a 3:4 ratio transformer, where the primary coil has 4 turns and the secondary coil has 3 turns or vice versa.

* * * * *